Jan. 23, 1934.   H. H. MARSHALL   1,944,716
APPARATUS FOR CONTROLLING THE LEVEL OF LIQUIDS
Filed May 14, 1930   2 Sheets-Sheet 1
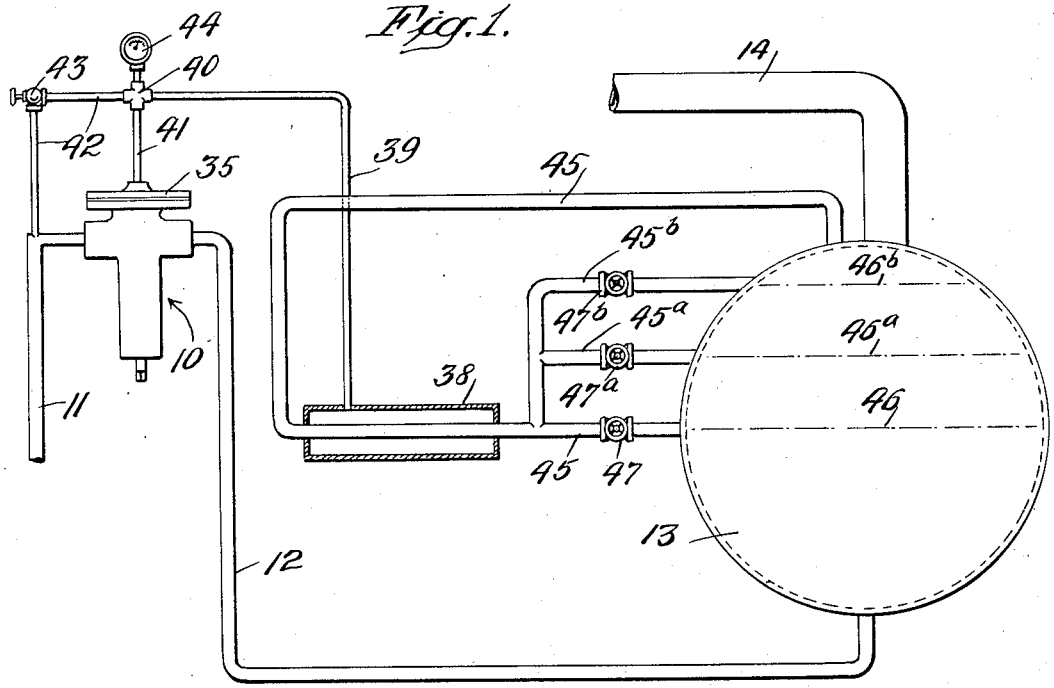
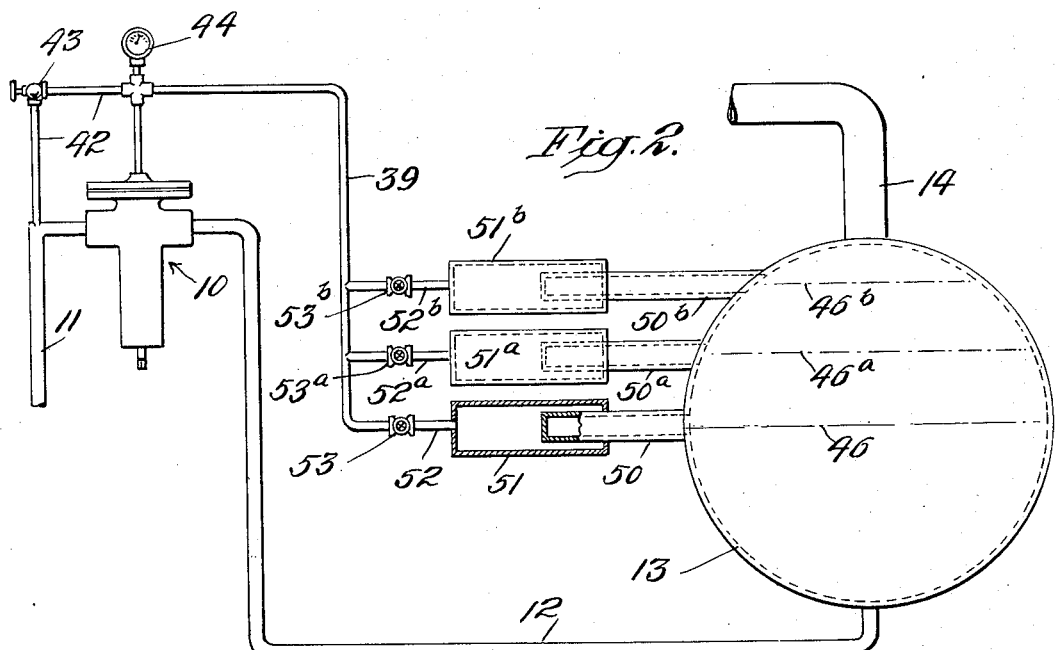
INVENTOR
Henry H. Marshall
BY Archibald Cox
ATTORNEY

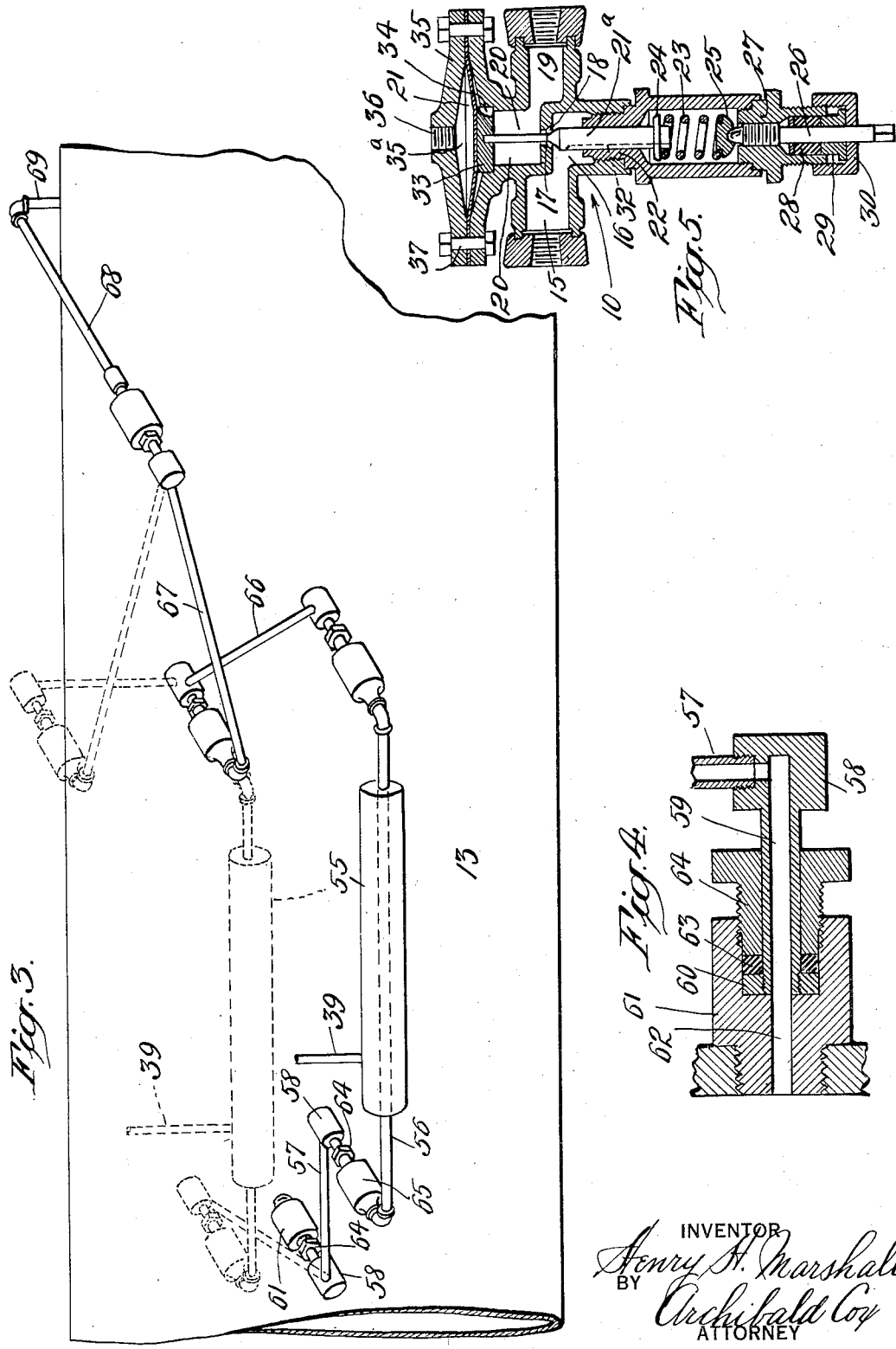

Patented Jan. 23, 1934

1,944,716

UNITED STATES PATENT OFFICE 1,944,716

APPARATUS FOR CONTROLLING THE LEVEL OF LIQUIDS

Henry H. Marshall, Highland Park, N. J., assignor, by mesne assignments, to Carrier Research Corporation, Newark, N. J., a corporation of New Jersey Application May 14, 1930. Serial No. 452,216

10 Claims. (Cl. 62—8)

The invention relates to liquid level control and more particularly to controlling the level of confined refrigerating liquids. Although the invention is applicable to the control of the level of any kind of confined liquid which differs in temperature from the surrounding atmosphere or other medium it has been developed principally in connection with controlling the level of liquid refrigerants in various types of receptacles, such as tanks, shell and tube containers, refrigerating evaporators, and the like. It has been proposed heretofore to maintain the level of liquid refrigerants in such receptacles by means of float valves, but this form of control has in general been unsatisfactory. Without pointing out specifically why these float valves are unsatisfactory it is sufficient to say that they are the object of constant attempted improvement in order to produce one which will function satisfactorily under all conditions and pressures. Such a float valve has not yet been produced, so far as I am aware, because of inherent mechanical difficulties and the nature of the substance to be controlled.

One object of the invention is to provide an improved arrangement of liquid level control in which the use of a float valve is eliminated. Another object of the invention is to control the level of liquid refrigerants or the like thermostatically. A further and more specific object of the invention is to control the feed of liquid refrigerant into the receptacle by means of a thermostatic device the operation of which is controlled by the level of the liquid in the receptacle.

These and other objects are accomplished by apparatus of which three embodiments are illustrated in the accompanying drawings, in which: Fig. 1 is a fragmentary elevation of a refrigerating system embodying one form of the invention, parts being broken away to show underlying structure; Fig. 2 is a similar view of another form; Fig. 3 is a side view of a third form in which the thermal chamber or unit can be adjusted to various heights to correspond with desired liquid levels in the container; Fig. 4 is a section of the flexible connection with the side of the container; and Fig. 5 is a central vertical section of the expansion valve.

Referring to Figs. 1 and 5 of the drawings, 10 designates an expansion valve connecting a high pressure supply line 11 with a low pressure line 12 through which the refrigerant passes into a container or receptacle 13, which may be a cooler or an accumulator or a low pressure evaporator in which liquid refrigerant is to be maintained substantially at a predetermined level. For convenience, the container 13 will hereinafter be referred to as an evaporator. The refrigerant may be of any suitable material, such as ammonia, sulphur dioxide, methyl chloride, or carbon dioxide.

The refrigerant passes into the evaporator 13 at the bottom thereof and the vaporized refrigerant which collects in the upper part of the evaporator passes therefrom into a discharge line or pipe 14 which returns the vaporized refrigerant to the suction end of the compressor (not shown).

The expansion valve 10 which is intended to be controlled thermostatically in accordance with changes in liquid level in the evaporator 13 and is illustrated in a convenient simple form, includes an inlet 15 connected with the high pressure supply line 11 and communicating with a chamber 16 at the lower side of a valve seat 17 having a port 18 therein, and an outlet 19 communicating with a chamber 20 at the upper side of said valve seat and closed at its upper side by means of a diaphragm 21 of suitable material. The lower end of the port 18 is flared to present a conical surface to cooperate with a corresponding conical surface on a reciprocable valve member 21a which is slidably mounted in a plug 22 secured in the lower part of the valve body 10, as by means of screw threads on the two parts.

The lower end of the reciprocable valve member 21a extends into a tubular portion of the plug 22 which contains a compression spring 23 interposed between a stop 24, such as an annular flange on the lower end of the reciprocable member 21a, and a spring cap 25 carried on the upper end of an adjusting spindle 26. The spindle 26 is provided near its upper end with a threaded portion which cooperates with an internally threaded plug 27 secured, as by means of screw threads, in the lower end of the tubular portion of the plug 22.

The main portion of the spindle 26 is cylindrical and extends through a lower tubular portion of the plug 27 where a tight seal around the spindle is provided by means of packing material 28, a packing gland 29, and a cap 30 surrounding said spindle and having an internally threaded flange screwed over the lower end of the tubular extension of the plug 27. To maintain the pressure conditions substantially the same in the chamber 16 and in the tubular portion of the plug 22 and thereby avoid interference which would otherwise exist, a suitable connection is provided as by means of a groove 32 in the longitudinally movable member 21a.

For control by the diaphragm 21, the valve member 21a is provided with a reduced upper end which extends upwardly through the port 18 and enters a suitable recess on the lower side of a diaphragm pusher 33 slidable in a suitable guideway in the upper part of the valve casing. Communication between the low pressure chamber 20 of the valve and the lower side of the diaphragm 21 is provided in a suitable manner, as by means of a recess 34 in the pusher 33.

At the upper side of the diaphragm is a cover 35 providing a chamber 35a above the diaphragm and having a central opening 36 for connection with a suitable thermostatic control device. The diaphragm 21 is gripped at its edges between the upper part of the valve casing and the cover 35 which is secured to the valve casing in any suitable manner, as by use of bolts 37.

The thermostatic system here illustrated includes a thermal chamber or unit 38 connected by means including a pipe or tube 39 with the central opening 36 of the cover 35 of the valve. Preferably this connection is made by connecting the tube 39 with one side of a cross connecting member 40 connected at its lower side with the upper end of a pipe 41 of which the lower end is screwed in the central opening 36 of the cover. The other side of the connecting member 40 is connected by a pipe line 42, containing a valve 43, with the high pressure line 11, so that by opening the valve 43 the thermostatic system may be charged with a suitable amount of the refrigerant to produce the desired pressure which may be indicated on a suitable pressure gauge 44 connected with the upper end of the cross connection 40.

In order to operate the thermostatic system to maintain the desired liquid level in the container or evaporator 13, there is provided a pipe 45 extending horizontally from the evaporator at the lowest level at which the liquid refrigerant is to be maintained at any time, and through the thermal chamber or unit 38. The pipe 45 is also extended from the farther end of the thermal chamber to the top of the evaporator 13 for the purpose of balancing the pressures at the opposite ends of said pipe 45 and consequently allowing the liquid refrigerant to extend completely through the thermal chamber and rise to the same level in the pipe as in the evaporator 13.

If the level of the liquid refrigerant in the evaporator 13 is substantially at the line 46 (Fig. 1), the portion of the pipe 45 lying within the thermal chamber 38 will receive liquid refrigerant. The temperature in the thermal chamber will be lowered accordingly, thus reducing the presure in the chamber 35a at the upper side of the diaphragm 21 and permitting the valve member 21a to rise against its seat and close the valve 10 to cut off the supply of refrigerant to the evaporator. Then as soon as the liquid level in the evaporator falls below the level indicated by the line 46, the temperature in the thermal chamber will rise and the pressure in the chamber 35a at the top of the diaphragm will be increased sufficiently to depress the diaphragm and open the valve 10 to again supply refrigerant to the evaporator. Such opening and closing of the valve will occur repeatedly with the effect of maintaining the liquid at substantially the same level.

To enable adjustment for maintaining the liquid at other and higher levels, the pipe 45 is provided between the thermal chamber 38 and the evaporator with a shut off valve 47, and between the valve 47 and the thermal chamber 38 the pipe 45 is connected with one or more pipe sections each containing a shut off valve and connected with the evaporator. As illustrated in Fig. 1, there are two additional pipe sections 45a and 45b connected with the evaporator 13 at levels 46a and 46b, respectively, and provided with shut off valves 47a and 47b, respectively. If it is desired to maintain the liquid level at line 46, the valves 47a and 47b are closed and the valve 47 left open. Corresponding settings of the valves can be made to maintain the liquid level at either of the lines 46a and 46b.

It will be seen that in this form of the invention, the expansion valve 10 is controlled in accordance with temperature changes in the pipe 45 connected at one end with the evaporator at liquid level, and at the other end with the upper or vapor containing part of the evaporator.

The operation of the apparatus, illustrated in Figs. 1 and 5 and just described, is substantially as follows: High pressure liquid enters the pressure reduction or expansion valve 10 through the high pressure line 11 and flows from the valve through the low pressure line 12. The valve member 21a opens and closes the port 18 in the valve seat 17 and is moved upwardly to closing position or downwardly to open position in direct accordance with the movement of diaphragm 21, which is subjected at its upper surface to the pressure prevailing in the thermal unit or chamber 38 and at its lower side to the evaporator pressure existing in the chamber 20 and to the upward pressure exerted by the compression spring 23 acting through the valve member 21a. The spring pressure is determined by the adjustment of the screw or spindle 26 and when the pressure in the thermal unit 38 falls until it approaches or reaches the evaporator pressure the valve is closed by means of the spring 23.

When the pressure in the thermal unit or chamber 38 overbalances both the evaporator pressure and the pressure of the spring, the expansion valve opens. This occurs when the liquid level drops below the part of the pipe 45 passing through the thermal unit 38 and the unit is warmed by the surrounding air. When the thermal unit pressure is reduced to the extent of being overbalanced by the combination of the evaporator pressure and the spring pressure, the valve closes. This occurs when the cold liquid from the evaporator flows into the horizontal portion of the tube or pipe 45 which constitutes the inner tube of the thermal unit 38, and provides the governing temperature influence which overcomes the outside air influence and reduces the pressure in the thermal unit.

The thermal unit may take different forms, but should provide for the free admission of liquid from the evaporator into a tube from which the gas may escape to the evaporator to equalize the pressure, should permit the tube liquid level to equalize with the evaporator liquid level, and should provide for the exposure of the chamber or unit 38 to the warmer air of the room.

In the embodiment of the invention illustrated in Fig. 2, the pipes 45, 45a and 45b of Fig. 1 are replaced at corresponding levels by horizontal stub nipples 50, 50a and 50b, respectively, and the single thermal chamber or unit 38 of Fig. 1 is replaced by a plurality of thermal chambers or units 51, 51a and 51b enclosing the closed outer ends of nipples 50, 50a and 50b, respectively. These thermal chambers 51, 51a and 51b are connected with the pipe 39 by branches 52, 52a and 52b, respectively, and said branches 52, 52a and 52b are provided with suitable shut off valves 53, 53a and 53b, respectively. It should be understood that each of the stub nipples is of sufficient diameter to admit the liquid and to free itself of gas generated therein. In other words, each stub nipple will carry to the corresponding thermal chamber the true level in the evaporator 13 when such level is within the range of the nipple.

The operation of this form of the invention is substantially the same as for the form illustrated in Fig. 1, the level to be maintained in the evaporator 13 being determined in the Fig. 2 form by manipulating the valves 53, 53a and 53b in the same manner as the valves 47, 47a and 47b are manipulated in the Fig. 1 form. In the form of the invention shown in Fig. 2, the operation of the expansion valve is controlled by temperature changes in any one of the nipples selected to control the valve.

In Fig. 3, there is illustrated an embodiment of the invention in which there is but one thermal chamber or unit 55 and the liquid level to be maintained in the evaporator 13 is determined by adjusting the thermal chamber to a corresponding level. The thermal chamber 55 is connected with the upper part of the thermostatic valve by means of a flexible tube 39, preferably of mild steel, and may be held at any desired level as by means of flexible conduits, one connecting one end of the inner tube 56 of the thermal chamber with a point at the side of the evaporator and as low as it would be desired to have the liquid level in the evaporator at any time, and the other conduit connecting the other end of the inner tube with the upper part of the evaporator.

The flexible conduit at the left of Fig. 3 includes a rigid piece of pipe 57 screwed at one end into a lateral opening in a member 58 having a longitudinal passage 59 extending far enough in one direction to communicate with said lateral opening and in the other direction to the other or inner end of said member, where said passage communicates with the interior of the evaporator. As here shown, the member 58 is provided at its inner end with an annular member or ring 60 fitting into a suitable bore in the outer end of a member 61 secured in the wall of the evaporator 13, as by means of a reduced inner end screwed into a corresponding opening in the wall of the evaporator. The member 61 is also provided with a reduced bore 62 for connecting the passage 59 with the interior of the evaporator.

The member 58 may be secured to the member 61 in any suitable manner, as by means of packing 63 engaging the outer face of the ring 60 and engaged in turn by a packing gland 64, preferably screwed into the outer end of the member 61. This connection provides a tight seal between the parts and permits relative rotation between member 58 and member 61, and is such as to resist such relative rotation frictionally and to retain such parts in any rotational relation to which they may be set.

At its other end, the pipe 57 is connected by means of a similar member 58 and a packing gland 64 with a member 65 connected with the adjacent end of the inner tube 56 but positioned at right angles thereto. At its other end, the inner tube 56 is connected with the adjacent end of a short pipe 66 in the same manner, for example, as the other end of the tube or pipe 56 is connected with the pipe 57. The other end of the pipe 66 is connected in a similar manner with one end of a pipe 67, of which the other end is connected in the same general manner with the outer end of a pipe 68 secured at its other end, as by means of an elbow, with the upper end of a pipe 69 projecting upwardly from the top of the evaporator 13 and communicating with the interior thereof.

It will be seen that the pieces of pipe 66 and 67 form a linkwork adapted not only to permit raising and lowering of the adjacent end of the thermal chamber but also to permit longitudinal movement of the thermal chamber as one end of the pipe 57 swings in an arc of a circle. In this connection, it should be understood that the thermal chamber 55 should not be placed lower than the passage 62 which communicates with the interior of the evaporator at the side thereof. In Fig. 3, the thermal chamber 55 is shown in full lines in its lowest operative position and in dotted lines in a higher position.

Among the various disadvantages of float valves are the following: Float valves must be located adjacent to the floats and the floats must be located at the surface of the liquid. Also the floats will not act satisfactorily where the liquid surface is violently agitated and the float valve mechanism in general is not adapted for use where it will be subjected to excessive vibration and wear. In this connection it may be said that in the evaporator of a refrigerating system there is considerable boiling of the liquid which interferes with float valve control. The above disadvantages are in general obviated by use of the present invention which enables the control or expansion valve to be placed at any level thus avoiding any requirement of special design of the apparatus in general.

Another advantage of the present invention is that a high pressure and high temperature line may be run to any point where a refrigerator or cooler is to be fed with refrigerant thus avoiding the use of heat insulating covering, such as cork. A further advantage is that the valve is installed in the pipe line where no large amount of liquid is present thus making it easy to open and repair the valve.

From the foregoing description it will be recognized that the present invention provides for maintaining liquid refrigerants at predetermined levels by controlling the feed valve for the receptacle in which the liquid refrigerant is kept by means of a thermal unit the operation of which is responsive to the level of the liquid refrigerant in the receptacle and is responsive to the temperature of the atmosphere or other medium surrounding the thermal unit. It will be recognized therefore that the invention may have other forms than that specifically shown and described herein without departing from the principle of the invention and that such other forms are within the scope of the appended claims.

I claim:—

1. In a refrigerating system, the combination with a container receiving liquid refrigerant and a thermostatic pressure reducing valve for controlling the level of liquid refrigerant in said container, of a thermal unit connected with said valve to operate the same and means for varying the temperature of said thermal unit in accordance with variations in liquid level in said container and thereby operating the valve to maintain a predetermined liquid level in said container, such temperature varying means including a pipe to cooperate with said thermal unit in determining the temperature of the latter, means for connecting said pipe at one side of said thermal unit with said container at different predetermined levels to be maintained, and a connection between said pipe at the other side of said thermal unit with said container at a point higher than any of said predetermined levels.

2. In a liquid level control for a container, the combination of a valve associated with said container for admitting liquid to the container and thermostatic control means for said valve including a thermal unit adapted to respond to liquid at various levels within said container, the unit being arranged to receive fluid from any one of a plurality of levels therein.

3. In a liquid level control for a container, the combination of a valve associated with said container for admitting liquid to the container and thermostatic control means for said valve including a thermal unit, said unit being adapted to open said valve when the liquid in said container is below a desired level, and means for connecting said thermal unit with said container, such connecting means being adjustable to subject said thermal unit to the action of the liquid in said container when the liquid reaches any one of a plurality of predetermined levels.

4. In a liquid level control for a container, the combination of a valve associated with said container for controlling admission of liquid thereto and thermostatic valve control means including a thermal unit responsive to the liquid, and means for connecting said thermal unit with said container, such connecting means being adjustable to position said thermal unit at different levels with respect to said container to render said thermal unit subject to the action of said fluid at any one of a plurality of different levels.

5. In a liquid level control for a container, the combination of a valve associated with said container for controlling the liquid level therein and thermostatic valve control means including a plurality of thermal units connected with said container at different levels and adjustable connections for placing said valve under the control of any one of said thermal units.

6. In a refrigerating system, the combination with an evaporator receiving liquid refrigerant and a thermostatic expansion valve controlling the liquid level in said evaporator, of a pluraliy of nipples projecting from said evaporator at different levels and closed at their outer ends, a plurality of thermal chambers each enclosing the outer end of a corresponding one of said nipples, and connections between said thermal chambers and said valve adjustable to place said valve under control of any one of said thermal chambers.

7. A combination of apparatus for controlling the level of liquid within a container comprising a valve, a thermal unit, said valve operating responsive to differences in pressure within the unit and the container, the pressure exerted by said unit depending upon the level of liquid within the container and means for connecting said unit to said container at a plurality of points at different levels.

8. A container and a combination of apparatus for controlling the level of liquid therein, comprising a valve, a plurality of thermal units, each of said units being connected to said container, said valve operating responsive to differences in pressure existing within any one of said units and the container, said thermal units being arranged to receive liquid from different levels within the container and means for connecting the valve to any one of said thermal units.

9. A liquid level control for a container comprising a valve for admitting liquid to the container, a thermal unit for actuating the valve, the actuation of the valve depending upon the receipt of liquid by the unit from said container, the receipt of liquid by the unit depending upon its position with respect to the container and means for shifting the position of the unit with respect to the container.

10. A liquid level control for a container comprising a valve for regulating the level of liquid in the container, a thermal unit for actuating the valve, the actuation of the valve depending upon the receipt of liquid by the unit from said container, the receipt of liquid by the unit depending upon its position with respect to the container and means for admitting liquid to the unit from any one of a plurality of levels within the container.

HENRY H. MARSHALL.